United States Patent

Harrison

[11] Patent Number: 5,870,468
[45] Date of Patent: Feb. 9, 1999

[54] ENHANCED DATA PRIVACY FOR PORTABLE COMPUTERS

[75] Inventor: Colin George Harrison, Brookfield, Conn.

[73] Assignee: International Business Machines Corporation, Armonk, N.Y.

[21] Appl. No.: 609,402

[22] Filed: Mar. 1, 1996

[51] Int. Cl.$^6$ .................... H04L 9/00; H04K 1/00
[52] U.S. Cl. .................................... 380/4; 380/23
[58] Field of Search .................... 380/4, 25, 49, 380/30, 23, 3

[56] References Cited

U.S. PATENT DOCUMENTS

| | | | |
|---|---|---|---|
| 4,864,616 | 9/1989 | Pond et al. | 380/25 |
| 5,007,082 | 4/1991 | Cummins | 380/4 |
| 5,029,207 | 7/1991 | Gammie | 380/23 X |
| 5,212,729 | 5/1993 | Schafer | 380/4 |
| 5,222,133 | 6/1993 | Chou et al. | 380/4 |
| 5,327,563 | 7/1994 | Siingh | 380/4 X |
| 5,475,839 | 12/1995 | Watson et al. | 380/4 X |
| 5,586,186 | 12/1996 | Yuval et al. | 380/4 X |
| 5,699,428 | 12/1997 | McDonnal et al. | 380/4 |

*Primary Examiner*—George Dombroske
*Assistant Examiner*—Paul D. Amrozowicz
*Attorney, Agent, or Firm*—Anne Vachon Dougherty; Douglas W. Cameron

[57] ABSTRACT

A method and an apparatus for protecting selected files in a portable computer system. With this invention a user selects a set of riles on a hard disk of the system for protection. This invention uses an encryption key, a secret key and an algorithmic transform to protect the selected files. With this invention the selected files are encrypted with the encryption key, and two copies of the encryption key are scrambled, one with the secret key and one with the transform of the secret key. Then, both scrambled versions of the encryption key are stored on the hard disk. When the user enters the secret key, the two scrambled versions of the encryption key are unscrambled using the key entered by the user and by using the transform of the key entered by the user. These unscrambled versions are then compared. If these unscrambled versions match, the original encryption key has been correctly restored and selected files will be decrypted either immediately or when referenced by an application program. This invention also calls for re-encrypting the selected files upon expiration of a timer indicating that the computer is idle or upon the repeated failure of a user to enter the secret key when requested.

12 Claims, 6 Drawing Sheets

5,870,468

ENHANCED DATA PRIVACY FOR PORTABLE COMPUTERS

TECHNICAL FIELD

This invention describes a method and an apparatus for unobtrusively protecting data on a portable computer by encrypting the data as background activity and requiring the user to provide a secret in order to decrypt the data.

DESCRIPTION OF THE PRIOR ART

Portable computers are susceptible to theft. While the theft of a computer is a financial loss, the loss of personal or commercial data may be more serious, particularly if the data falls into the hands of a competitor or enemy. Password protection deters unauthorized use of the computer, and methods to prevent the easy resetting of the power on password have been introduced by IBM. Password protection of removable disks has also been introduced to prevent their being swapped into operating computers, but there is currently no protection against unauthorized access to the hard disk itself.

Earlier work in this area has been unsatisfactory because:

It ignored the need to automate the process to minimize the intervention required by the user (U.S. Pat. No. 5,327,563), (NL 9200115-A).

It dealt with the encryption of a specific file, rather than automatically protecting all files on a hard disk and automatically making them available to the authenticated user (U.S. Pat. No. 5,327,563, NL 9200115-A, U.S. Pat. No. 4,864,616, IBM Technical Disclosure Bulletin, Vol. 35, No. 4A, p. 98, September 1992, U.S. Pat. No. 5,007,082).

It was concerned with the protection of shared hard disks rather than a single user case (IBM Technical Disclosure Bulletin, Vol. 31, No. 5, p. 146).

It depended on specific hardware for the encryption, rather than implementing the algorithm in software (IBM Technical Disclosure Bulletin, Vol. 31, No. 5, p. 146, October 1988, EP 411-712-A).

It requires a hardware device for the authentication of the user which is more expensive and less convenient for the user U.S. Pat. No. 5,212,729, U.S. Pat. No. 5,191,611).

Even though the password may be hidden on the hard disk, it can nonetheless be found by exhaustive search if the attacker has sufficient time.

SUMMARY OF THE INVENTION

Accordingly, it is an object of this invention to provide a simple and unobtrusive method and apparatus to protect data on a portable computer.

This invention describes a method of protecting selected files stored on a hard disk of a computer. With this invention selected files are automatically encrypted after the computer has been idle for a user-defined period however, the encryption key is not stored in its original form on the hard disk, and this is a main feature of this invention.

Instead of storing the original encryption key on the hard disk, as is found in the prior art cited, the encryption key is scrambled with a secret key provided by the user and with an algorithmic transform of the secret key. Then, both of the scrambled versions of the encrypted key are stored on the hard disk of the computer. After the user-defined period above has been reached, or after each time the computer is started, the user is requested to enter a key, which should be identical to the secret key. The scrambled versions stored on the hard disk are then unscrambled with the key entered by the user (the entered key) and with the transform of the entered key. The unscrambled versions are then compared to see if they match. If there is a match, this proves that the original encryption key has been correctly restored, and any encrypted File that an application program attempts to open will be decrypted. However, if the user has failed repeatedly to correctly enter the requested key, the selected set of files will be automatically re-encrypted if necessary (using the version of the encryption key kept in system memory during normal operation). The encryption key is then deleted from system memory and the algorithmic transform stored in the hard disk will be deleted. The computer now contains no unencrypted version of the encryption key, and no transform algorithm which is required to restore the encryption key from the correct secret key. Access to the encrypted files is now prevented until a user a) restores the transform algorithm and b) correctly enters the secret key. The encryption key cannot be discovered even by exhaustive search of the hard disk, because it is not stored in its original form. Further, the password or secret key is also never stored in its original form on the hard disk. Thus, the password is essentially impossible to discover even if the attacker had physical possession of the disk and could pet-form extended attacks.

While the invention is particularly relevant to portable computers where the hard disk is used by a single user, the invention is also applicable to computers where the hard disk is shared among several users.

DESCRIPTION OF THE PREFERRED EMBODIMENT

Figure 1:
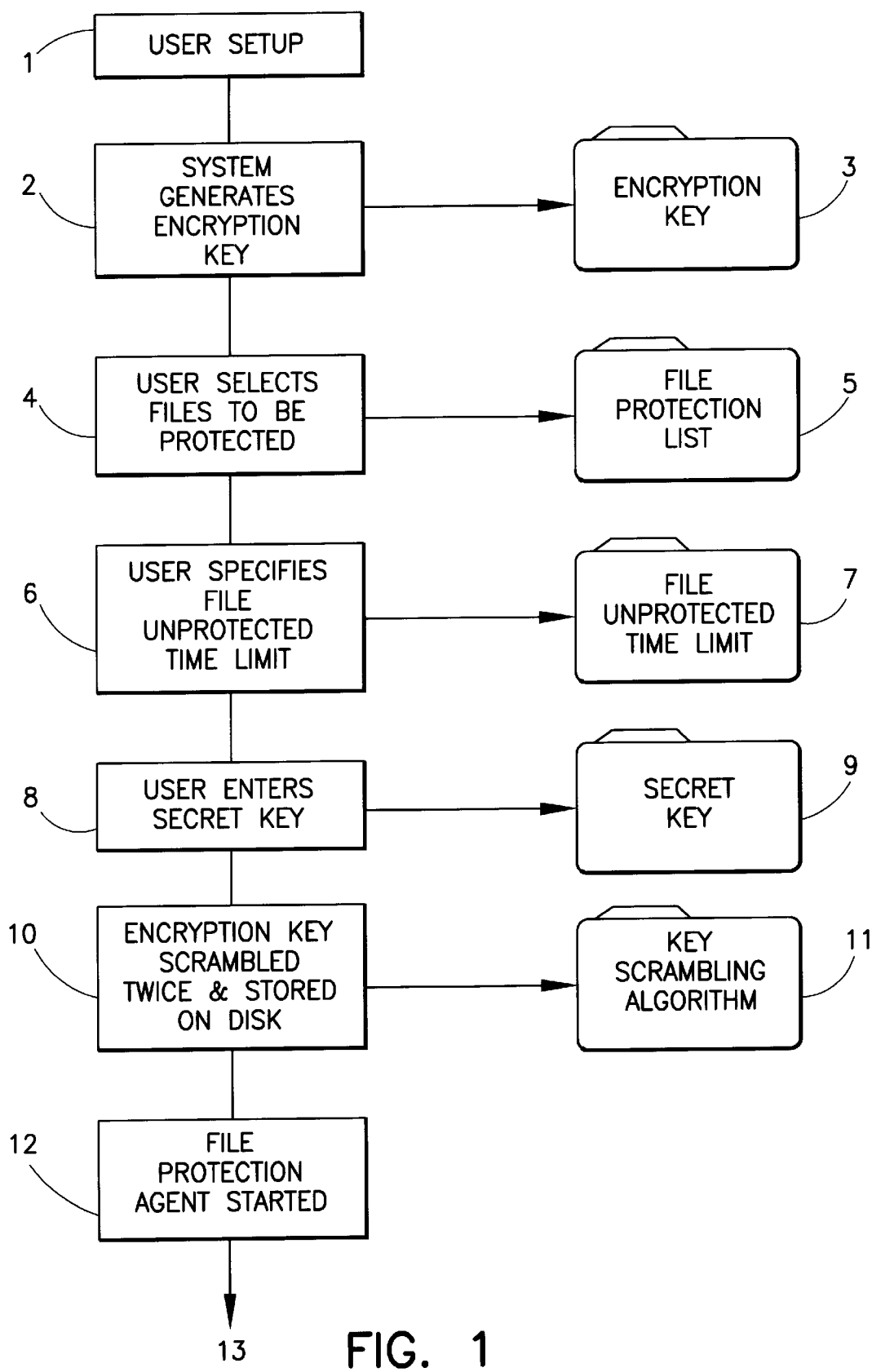
FIG. 1 is flow diagram of the user setup phase of the invention.
Figure 2:
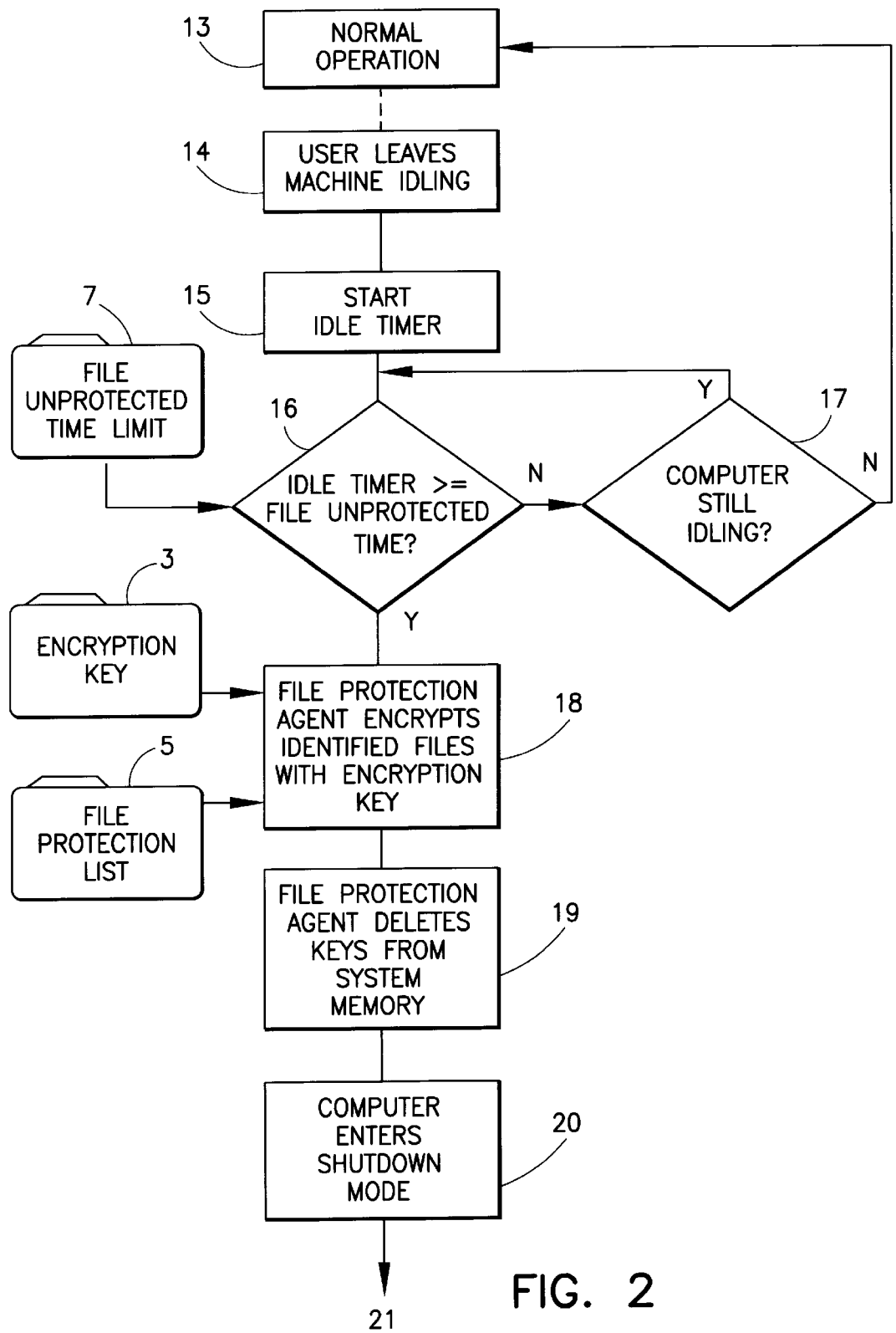
FIG. 2 is a flow diagram of the encryption phase of the invention.
Figure 3:
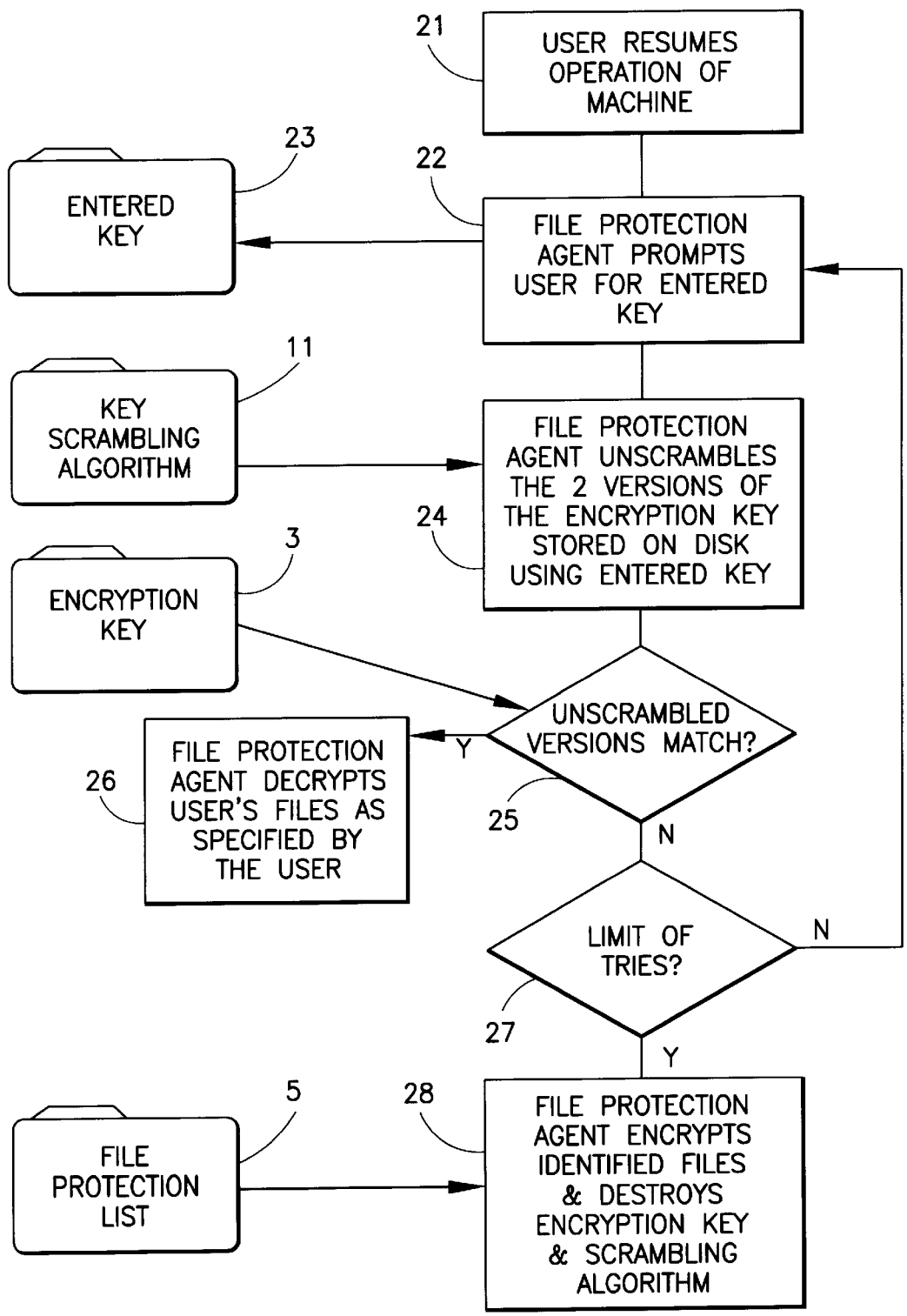
FIG. 3 is a flow diagram of the decryption phase of the invention.

FIGS. 1–3 show the steps which are one embodiment of this invention. The operation of this invention has three phases:
1. User setup (FIG. 1),
2. File encryption (FIG. 5), and
3. File decryption (FIG. 6).

Referring to FIG. 1, the method for this invention comprises the following steps:
1. At the initial set up time (2), an Encryption Key (3) is generated from a random seed.
2. The user specifies a set of files which are to be protected (4); this is the File Protection List (5). These files will be encrypted as described below. These files may be specified:
   Explicitly.
   By filename extension.

Object class.

Directory sub-tree.

The user may also specify a subset of this list of protected files, which is the list of files to be decrypted automatically when the computer is successfully re-started. This enables the user to keep many files protected, to decrypt some automatically and to decrypt some individually as they are referenced by an application.

The user also specifies (6) a File Unprotected Time interval (7), which will determine how long a file in the File Protection List (5) may remain unencrypted (or unprotected) after being closed. The user also specifies (8) a Secret Key (9) to be presented on demand to the computer. Neither the Secret Key (9) nor the Encryption Key (3) is stored in clear on the hard disk (30) and the user must keep separate copies of both. The Key Scrambling Algorithm (11) produces two encrypted or scrambled versions of the Encryption Key (3). One such version is produced by encrypting the Encryption Key (3) with the Secret Key (9), and the second such version is produced by encrypting the Encryption Key (3) with a specific transform of the Secret Key (9). An example of such a specific transform is a bit complement. That is, each bit of the Secret Key (9) is replaced by its complement (0 replaces 1, 1 replaces 0) to form a transformed version of the Secret Key (9). There are an extremely large number of such transforms; so to unscramble the Encryption Key (3), when it is stored on the hard disk (30), one needs to know both the Secret Key (9) and the specific transform used by the Key Scrambling Algorithm (11). The transform employed by the Key Scrambling Algorithm (11) could be varied parametrically from one user to another when the protection software is installed. The user must also keep a separate copy of the Key Scrambling Algorithm (11), as this may be deleted from the hard disk (30) automatically as part of the protection mechanism (28). Many encryption algorithms are possible for the encryption of the Encryption Key (3), for example the Data Encryption Standard (DES) algorithm. The two scrambled versions of the Encryption Key (3) are stored (10) on the computer's hard disk (30). See definitions and equations immediately below.

Definitions:

Ke=Encryption Key (3)

$K_s$=Secret Key (9)

$K_{SA}$=Key Scrambling Algorithm (11)

$E_x(y)$ is the encryption of input y using key x

S1=Scrambled version No. 1 of Ke

S2=Scrambled version No. 2 of Ke

Then:

S1=$E_{k_s}$(Ke) (Encryption of Kc with the secret key $K_s$)

S2=$Ek_{sa(Ks)}$(Ke) (Encryption of encryption key Ke with a key scrambing algorithm of the secret key $K_s$)

3. This initialization application also starts (10) an application program called the File Protection Agent (12). The program does not have a user interface, but runs continually as a low priority or background task in the computer. This application is also re-started whenever the computer system is re-started.

4. The user may now proceed to normal operation of the computer (13), running application programs and opening and closing files. The File Protection Agent (12) monitors signs of user activity (keystrokes, mouse movements). Whenever user activity appears to have ceased and the machine is idling (14), for example, there have been no keystrokes or mouse movements, the File Protection Agent (12) starts an Idle Timer (15). When this timer exceeds (16) the File Unprotected limit (7), the File Protection Agent (12) begins (18) to encrypt files on the File Protection list (5) using the non-scrambled version of the Encryption Key (3), which has been kept in the computer's system memory or RAM. If the user resumes use of the computer while the timer is still running, the timer is reset (17) and normal operation continues. If the user resumes use of the computer after the timer has expired (16), the File Protection Agent (12) will continue protecting all files (18) on the File Protection List (5). Use of the computer is indicated by user activity such as keystrokes or mouse movements.

5. In step (18), the File Protection Agent (12) reads the file from the hard disk (30), encrypts it using the Encryption Key, and writes it back as a new file with the same permission and so forth as the original file under a temporary name. Depending on the operating system, the File Protection Agent may need to perform additional File system operations to ensure that the hard disk space occupied by the original, unencrypted File cannot be recovered. Many encryption algorithms are possible for this process, for example the Data Encryption Standard (DES) algorithm. Then, the File Protection Agent (12) over-writes the sectors occupied by the original file, deletes the rile table entry and renames the encrypted file to the original name. As each file is encrypted, the file descriptor is annotated to reflect this. (This assumes that the file system's descriptor blocks support this annotation and can take note of it and invoke a description function when the file is next referenced. If this is not the case, then an alternative scheme is possible, see below).

6. When the File Protection Agent (12) has completed (18) the encryption of all the files specified by the user, the non-scrambled version of the Encryption Key (3) is deleted from the computer's system memory or RAM, and the user is blocked (20) from operating the computer. This blocking may be accomplished either by displaying a screensaver which requires the Secret Key (9) to be entered, or by otherwise blocking access to all other applications except one application which requires the Secret Key (9) to be entered (22). This removes from the computer the unscrambled key (Encryption Key (3)) required to decrypt the protected files. The Encryption Key (3) is still present in the two scrambled forms produced by the Key Scrambling Algorithm (11) and written to the hard disk (30). However, the unscrambled form of the Encryption Key (3) can only be recovered by re-entering the correct Secret Key (9) and employing the Key Scrambling Algorithm (11) in reverse.

7. The files are now protected by encryption until the user enters the File Decryption phase of operation. When the user wishes to resume use (21) of the computer after the files have been encrypted, the user must correctly re-enter (22) the Secret Key (9). The key entered by the user (22) is the Entered Key (23) and may or may not be identical to the Secret Key (9). The File Protection Agent (12) verifies the Entered Key (23) by using it with the Key Scrambling Algorithm (11) to unscramble (24) the two scrambled versions of the Encryption Key (3) produced at step (10). If the two unscrambled versions of the Encryption Key (3) match (25), then the Entered Key (23) must be the correct Secret Key (9). See definitions and equations immediately below.

Definitions:

$K_e$=Encryption Key (3)

$K_s$=Secret Key (9)

$K_?$=Entered Key (23)

$K_{SA}$=Key Scrambling Algorithm (11)

$E'_x(y)$ is the decryption of input y using key x $U_1$=Unscrambled version of S1

$U_2$=Unscrambled version of S2
Then:
$U_1 = E'_{K?}(S_1)$
$U_2 = E'_{k_{\pi(U_2)}}(S_2)$
If U1=U2, then K?=Ks and U1=U2=Ke.

8. As the user now begins to reference files, the File Protection Agent (12) will begin to decrypt the protected files (26) on demand. If the user had defined a subset of the File Protection list (5), the File Protection Agent (12) will automatically decrypt all the riles in this subset. This enables all the decryption to take place at once and avoids the user encountering a succession of delays as riles are decrypted on-demand. To decrypt the file, the File Protection Agent (12) opens a new file under a temporary name with the same permissions and so forth as the target file. It then reads the target file, unscrambles it using the Encryption Key (3), and writes the unscrambled data to the temporary file. When this process is complete, the File Protection Agent (12) deletes the original file, renames the temporary file to the original name and returns control to the file system.

9. If the user does not enter the correct Secret Key (9), the File Protection Agent (12) will again invite (22) the user to enter the Secret Key (9). This loop may continue up to some limit (27), say three times, which is a non-modifiable parameter of the program. If the user cannot successfully enter the Secret Key (9) within this limit, the File Protection Agent (12) will erase the algorithm used to transform the Secret Key (9) when scrambling the Encryption Key (3). The Encryption Key (3) cannot be obtained from the hard disk except by unscrambling it with a the Secret Key (9); the Secret Key (9) is also not stored on the hard disk (30) and cannot be guessed because the Key Scrambling Algorithm (11) is missing. Once the files have been encrypted and the Encryption Key (3) removed from the computer memory, the protected Files cannot be diecrypted even if the hard disk (30) is removed from the computer. To restore normal operation, the user will have to re-install the scrambling algorithm used to produce the two scrambled versions of the Encryption Key (3).

10. If the computer's file system does not support the annotation of the file descriptor to indicate that the file has been encrypted, then the File Protection Agent (12) will decrypt all Files as soon as the Secret Key (9) has been entered correctly. This is more intrusive, since the user must wait for the completion of this process, but the user can selectively control which files are to be decrypted in this way. The user may also wish to make use of a user interface of the File Protection Agent (12) to explicitly request the decryption of certain files.

11. In the case of a portable computer, power management features will eventually shutdown the computer, potentially forestalling the execution of the File Protection Agent (12). This difficulty may be handled by various methods:

a. The File Unprotected Time (7) may be set to be shorter than the power management timeout.

b. The completion of encryption may be made part of the power management shutdown process.

c. The timer driving the File Protection Agent (12) may be enabled to wake up the computer (perhaps excluding the display).

Figure 4:
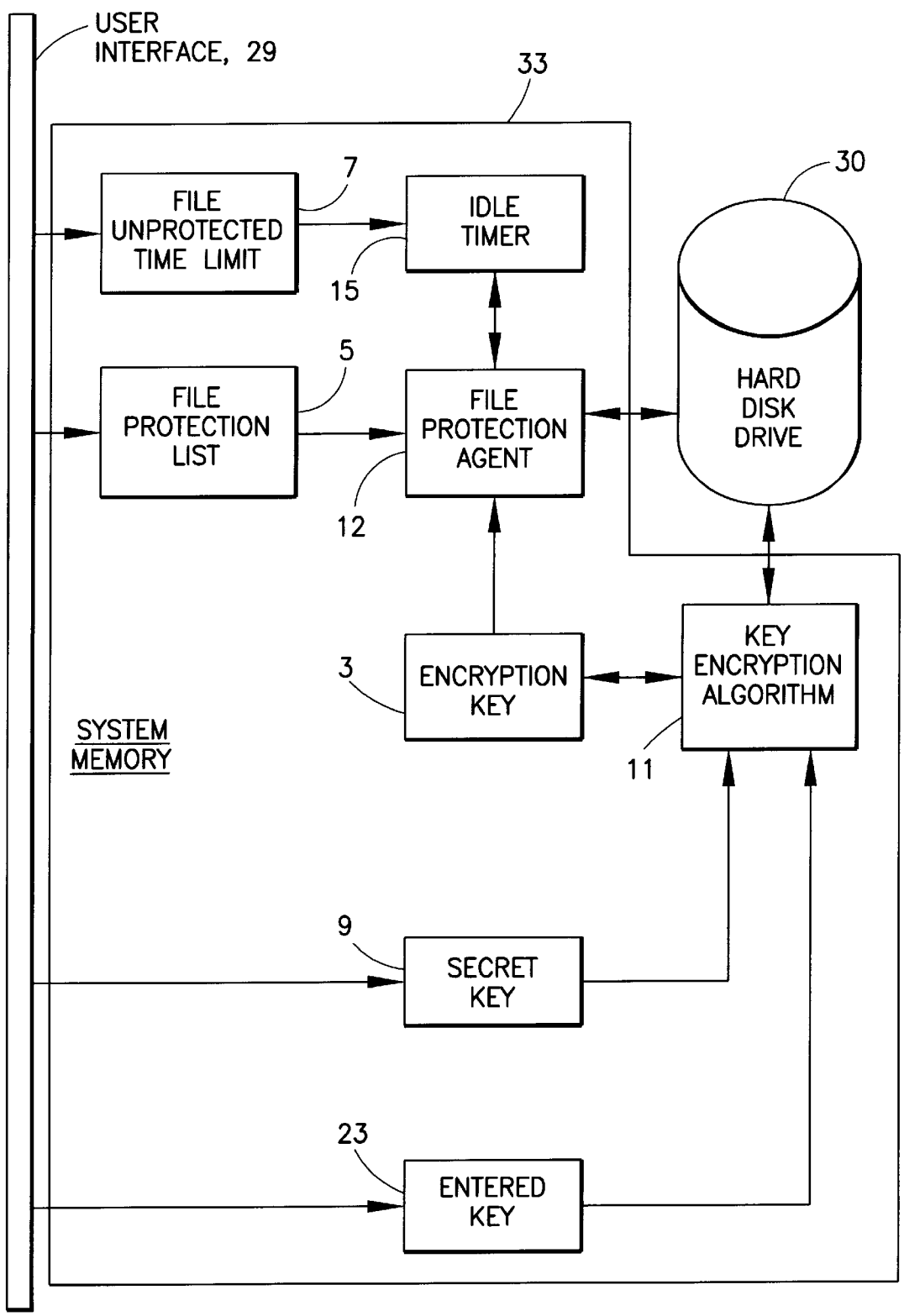
FIG. 4 graphically illustrates the hardware/software modules used in the invention.

Description of FIG. 4

FIG. 4 shows the major components of one possible embodiment of this invention. Some of the functions of the invention are here shown implemented in software and are shown to be resident in the computer's system memory or RAM (3, 5, 7, 9, 11, 12, 15, 23). The user interface (29) is a combination of software and hardware functions and provides the means for the user to interact with the computer and specifically with the software components of this invention. The hard disk (30) is the computer's hard disk where the files to be protected by this invention are stored.

The major component of the embodiment is the File Protection Agent (12), which is a low-priority or background task or application program. The File Protection Agent (12) receives information from the user via the user interface (29) about the files to be protected—the File Protection List (5)—and the maximum duration for which the computer can be idle—and possibly unattended—with the files unprotected—the File Unprotected Time Limit (7). The File Protection Agent (12) performs the encryption and decryption of the protected files using the Encryption Key (3), which is generated randomly by the computer at the initialization phase. The File Protection Agent (12) also protects the Encryption Key (3) for storage on the hard disk (30) by scrambling two copies of it, once with the Secret Key (9) and once with a transform of the Secret Key (9). This transform is incorporated in the Key Encryption Algorithm (11). The Secret Key (9) is defined once by the user via the user interface (29). When the user needs to decrypt the protected files, he or she is prompted to enter the secret key via the user interface (29). This Entered Key (23) is used to unscramble the Encryption Key (3) stored on the hard disk (30).

While the steps of encrypting the protected riles and scrambling the Encryption Key are here shown implemented in software, other embodiments may include performing these operations in hardware.

Figure 5:
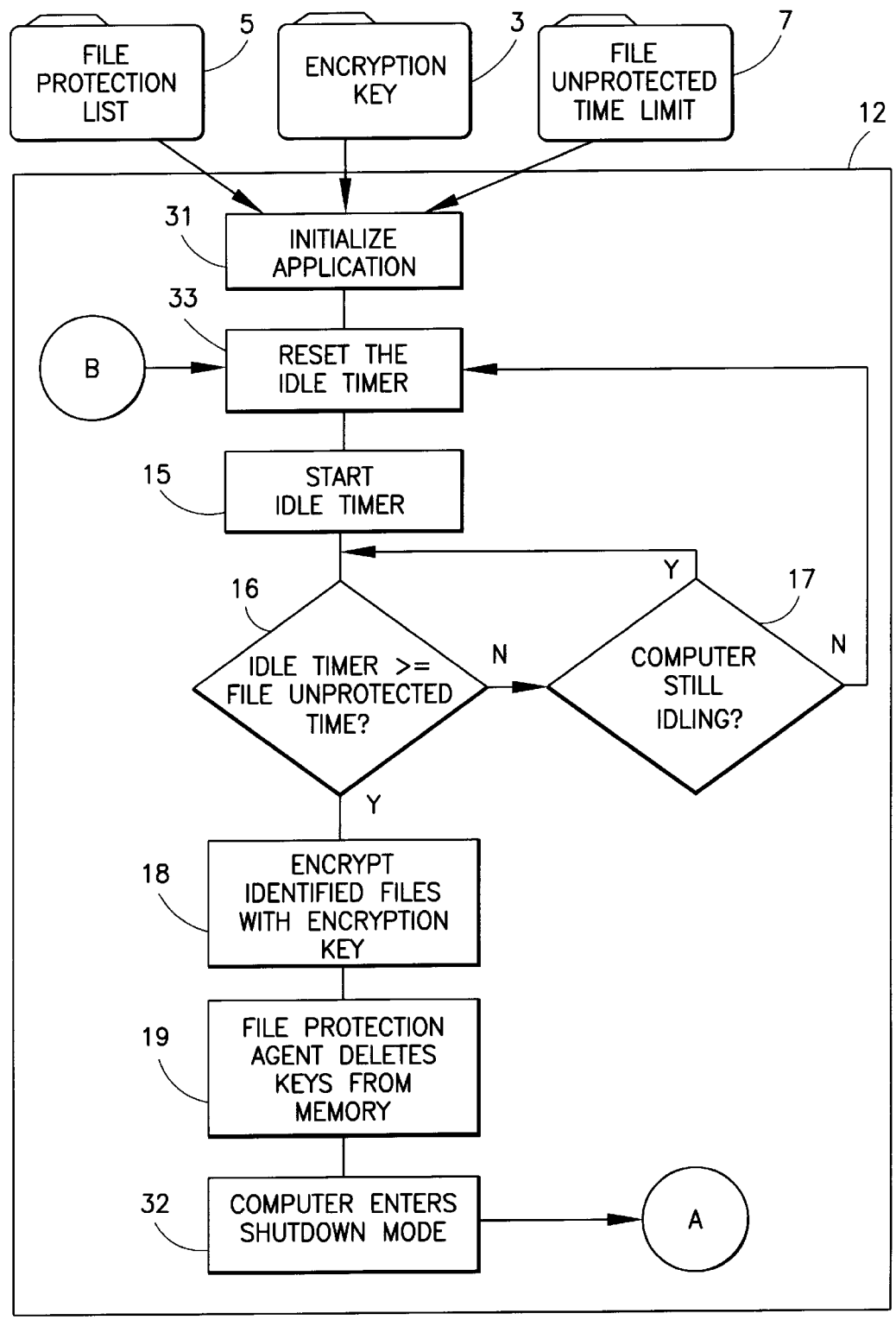
FIG. 5 is a flow chart of the File Protection Agent encrypting and protecting a set of files designated for protection.
Figure 6:
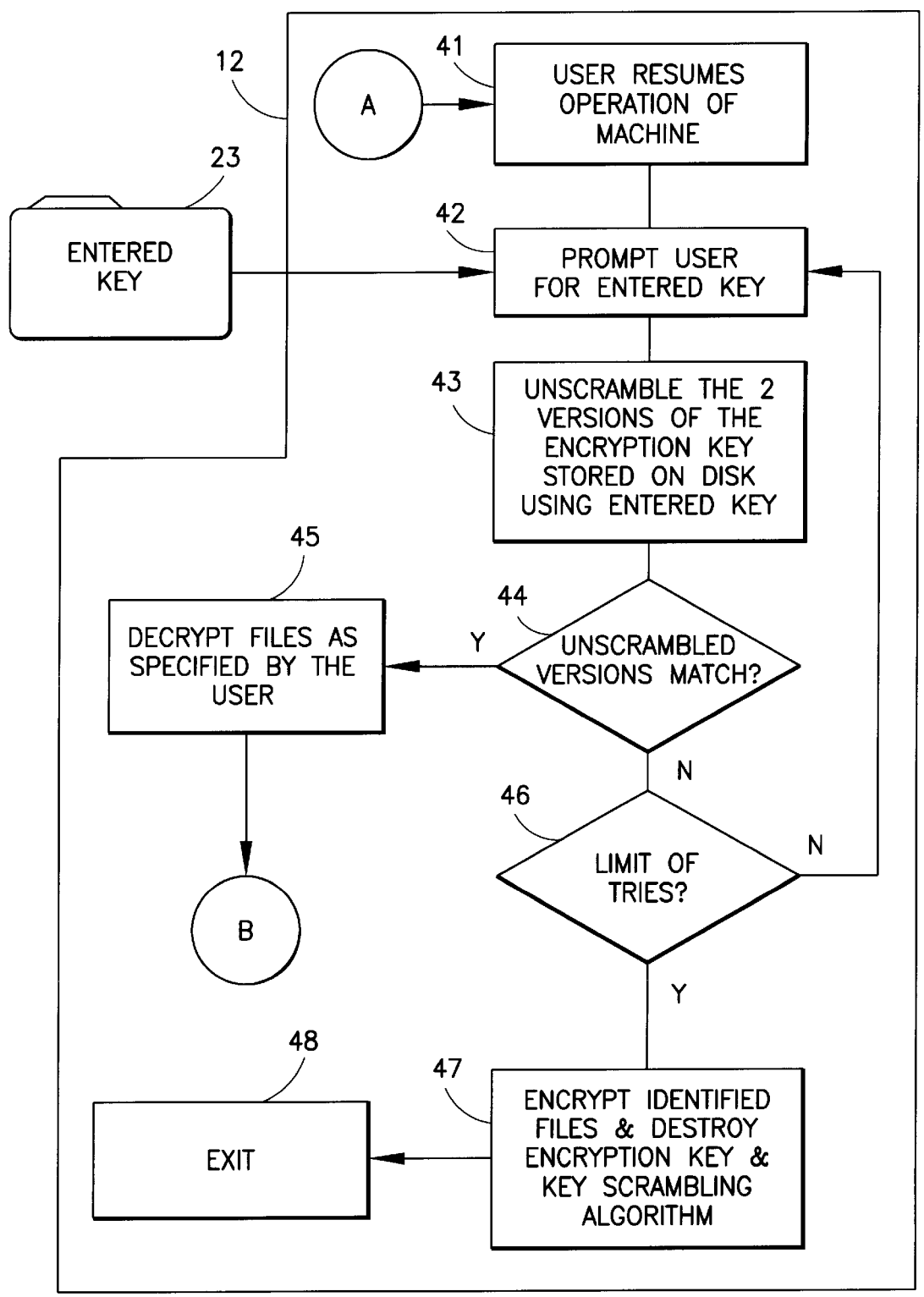
FIG. 6 is a flow chart of the File Protection Agent prompting a user for a secret key and decrypting the protected files if the user enters the secret key.

FIGS. 5 and 6 show a flow chart for an embodiment or the File Protection Agent (12). The File Protection Agent (12) is started either following the initial set up of the computer or following any re-start of the computer. It is initialized with the File Protection List (5), the Encryption Key (3), and the File Unprotected Time limit (7). After its initialization (31), the File Protection Agent (12) enters a loop in which it waits for the computer to become idle. When the computer has been idle for a time longer than the Unprotected Time Limit (7), the File Protection Agent (12) begins to encrypt (18) the files specified in the File Protection List (5) using the Encryption Key (3). When all the files have been encrypted, the file Protection Agent (12) suspends and the computer enters its shutdown mode (32).

Referring to FIGS. 5–6, when the user re-starts (41) the computer from the shutdown mode, or under other possible circumstances, the File Protection Agent (12) blocks the user interface (29) and prompts (42) the user for the Secret Key (23). It then uses the Entered Key (23) and the transform of the Entered Key (23) to unscramble (43) the two versions of the Encryption Key stored on the hard disk (30). If the two unscrambled versions match (44), then the Encryption Key (3) has been correctly restored and the File Protection Agent (12) will begin to decrypt (45) the protected files. If the two unscrambled versions fail to match, then the Entered Key (23) does not match the Secret Key (9) and the user is re-prompted (42) for the Secret Key (23). If the user repeatedly fails to enter the Secret Key (23) after a specified number of attempts (46), then the File Protection Agent (12) re-encrypts any files if necessary, removes the Encryption Key (3) From system memory if necessary, and removes the Key Scrambling Algorithm (11) from the hard disk (47). The File Protection Agent (12) then exits (48).

Having thus described my invention, what I claim as new and desire to secure by Letters Patents is:

1. A method of protecting a selected set of files stored on a hard disk of a computer, said method comprising:

a. encrypting each file of a selected set of files with an encryption key;

b. scrambling said encryption key with a secret key entered by an authorized user of said computer;

c. scrambling said encryption key with an algorithmic transform of said secret key; and d. storing both said scrambled versions of said encryption key on said hard disk, wherein none of said selected files will be decrypted until said secret key is entered and used to obtain said encryption key in clear text from said stored scrambled versions of said encryption key.

2. The method of claim 1 further comprising:

e. unscrambling both said scrambled versions of said encryption key with an entered key with said entered key transformed by said algorithmic transform, wherein said entered key is entered by a user wanting to access a file from said set of files;

f. comparing said unscrambled versions of said encryption key unscrambled in step e to check if the latter two unscrambled versions of said encryption key match, where said versions will match if said enter key corresponds to said secret key; and g. decrypting any file of said set of files that an application program attempts to open if said latter two unscrambled versions of said encryption key match.

3. The method of claim 1 further comprising:

e. requesting said user to enter a secret key f. unscrambling both said scrambled versions of said encryption key and said entered key transformed by said algorithmic transform;

g. comparing said unscrambled versions of said encryption key unscrambled in step f to check if the latter two unscrambled versions of said encryption key match, where said versions will match if said enter key corresponds to said secret key; and h. decrypting any file of said set of files that an application program attempts to open if said latter two unscrambled versions of said encryption key match.

4. The method of claim 3, wherein said requesting comprises requesting said user to enter said secret key when said selected files have been encrypted after a user-defined period has been reached.

5. The method of claim 3, wherein said requesting comprises requesting said user to enter said secret key each time said computer is started.

6. A method of protecting a selected set of files stored on a hard disk of a computer, said method comprising:

a. encrypting each file of said set of files with an encryption key when said computer has been idle for a user-defined period;

b. scrambling said encryption key with a secret key entered by an authorized user of said computer;

c. scrambling said encryption key with an algorithmic transform of said secret key; and d. storing both said scrambled versions of said encryption key on said hard disk.

7. A method as recited in claim 6 further comprising:

a. blocking access to a user interface of said computer when said computer has been idled for a user-defined time period.

8. The method of claim 6 further comprising:

e. requesting said user to enter an enter key;

f. unscrambling both said scrambled versions of said encryption key with said enter key and said enter key transformed by an algorithmic transform;

g. comparing said unscrambled versions of said encryption key unscrambled in step f to check if the latter two unscrambled versions of said encryption key match, where said versions will match if said enter key corresponds to said secret key; and h. decrypting any file of said set of files that an application program attempts to open if said latter two unscrambled versions of said encryption key match.

9. The method of claim 8 further comprising:

counting the number of times a user attempts to enter said secret key; and comparing said number to a threshold value.

10. The method of claim 9 further comprising automatically removing a component in said computer when said number of time said user has failed to enter said secret key exceeds said threshold.

11. The method of claim 10 wherein said removing comprises removing the encryption key from system memory.

12. The method of claim 10 wherein said removing comprises erasing said algorithmic transform from said hard disk.

* * * * *